United States Patent [19]

Adams

[11] 4,010,814
[45] Mar. 8, 1977

[54] INTERLOCK SYSTEM FOR EMERGENCY VEHICLES

[76] Inventor: Thomas C. Adams, 7190 W. 2nd Lane, Hialeah, Fla. 33014

[22] Filed: Oct. 16, 1975

[21] Appl. No.: 623,042

[52] U.S. Cl. .......................... 180/82 R; 180/103 R
[51] Int. Cl.² ...................................... B60K 26/02
[58] Field of Search ................ 180/82 R, 100, 101, 180/102, 103 R, 14 R

[56] References Cited
UNITED STATES PATENTS

| 706,295 | 8/1902 | Blood ............................ 180/82 R |
| 774,896 | 11/1904 | Robertson ...................... 180/82 R |

Primary Examiner—Joseph F. Peters, Jr.
Assistant Examiner—Terrance L. Siemens
Attorney, Agent, or Firm—Jack D. Slobod

[57] ABSTRACT

An interlock system for an emergency vehicle includes a manual switch to be actuated by a crew member at a rear end of the vehicle for enabling the vehicle to be started only if the he is at his post. The switch controls a relay for electrically energizing the wiper of a single pole double throw ignition switch which has a pair of contacts respectively feeding a starter switch and a buzzer to enable starting of the vehicle and to signal if the engine is shut off with the manual switch still actuated. A pair of indicator lamps, respectively located for view by the driver and the crew member, are energized in response to actuation of the manual switch to indicate that vehicle starting is enabled.

4 Claims, 1 Drawing Figure

4,010,814

INTERLOCK SYSTEM FOR EMERGENCY VEHICLES

FIELD OF THE INVENTION

The present invention relates generally to interlocks for preventing the starting of an automotive engine if certain safety conditions are not fulfilled. In its particular aspects the present invention relates to an interlock system for an emergency vehicle for preventing the vehicle from being started if a crew member is not at a predetermined post remote from the driver.

BACKGROUND OF THE INVENTION

In many fire emergency vehicles the operation or effectiveness of the vehicle depends on members of a crew being in proper position. Particularly in the case of double-drive vehicles, it is important that the tillerman be in position for steering the rear end of the vehicle. In other fire vehicles such as pumpers, it is important that the vehicle not leave until fire-fighters are in place on the rear platform provided thereon. Also, in modular vehicles, such as ambulances, the driver cannot see whether the crew members are located within the main body portion thereof.

While various interlock systems have heretofore been developed to prevent an automotive engine from being started if a seat belt is not fastened such systems are not readily adaptable to the purposes of the present invention.

OBJECTS OF THE INVENTION

It is an object of the present invention to provide an interlock system for an emergency vehicle to prevent the engine of the vehicle from being started if a crew member is not present at a predetermined post remote from the driver.

It is a further object of the present invention to provide an interlock system for an emergency vehicle as aforementioned which includes indicators for signalling when the vehicle may be started.

SUMMARY OF THE INVENTION

Briefly, the aforementioned and other objects of the present invention are satisfied by providing a first switch means to be actuated by a crew member of an emergency vehicle at a predetermined post remote from the driver to enable the driver to start the engine of the vehicle. This first switch means controls relay means for energizing a second switch means utilized by the driver for engine starting purposes. The second switch means includes a single pole double throw ignition switch having a wiper energized by the relay energizing means and having an associated contact feeding a starter switch. The other contact of the ignition switch feeds an audible signal to indicate that the engine has been shut off with the first switch means still actuated.

First and second indicator lamps are provided to be viewed respectively by the driver and the crew member. The lamps are energized in response to actuation of the first switch means. Further, for overriding the interlock system in a dire emergency, another switch means is provided interposed between a voltage source and the wiper of the ignition switch. This switch is configured for energizing another louder audible alarm when it is actuated to signal crew members that the interlock system has been bypassed.

Other objects, features and advantages of the present invention will become apparent upon perusal of the following detailed description of the preferred embodiment thereof when taken in conjunction with the appended drawing wherein:

FIG. 1 is an electrical schematic diagram of the interlock system of the present invention positioned within a schematic representation of an emergency vehicle.

DETAILED DESCRIPTION

Figure 1:
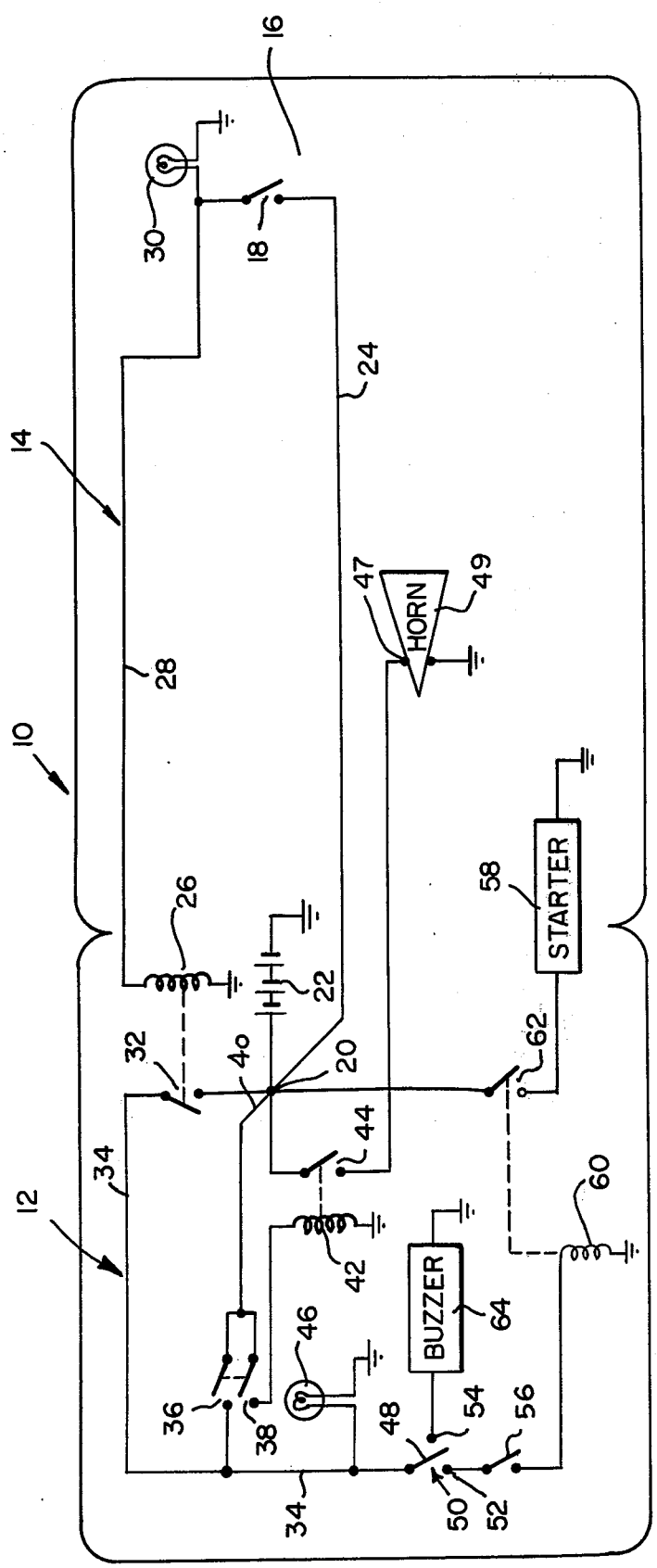

Referring to FIG. 1 of the drawing, there is schematically illustrated an emergency fire vehicle 10 such as a dual drive hook and ladder articulated vehicle having a tractor portion 12 and a trailer portion 14. Vehicle 10, being dual drive requires a tillerman to be positioned at a location 16 at the rear of the vehicle for steering trailer portion 14. The present invention relates to an interlock circuit which prevents the engine of vehicle 10 from being started unless the tillerman is at his post at location 16. It should be appreciated that the present invention is equally applicable to other types of emergency vehicles such as fire vehicles having a rear platform for carrying crew members or modular vehicles such as ambulances having a divided body portion, for preventing the vehicle from being started unless crew members which can't be seen by the driver are manning their posts.

In regard to the interlock circuit, a normally open manual switch 18 is provided at location 16, to be actuated by the crew member for indicating that he is at his post. One side of switch 18 is fed from the positive terminal 20 of a negatively grounded battery 22 via a lead 24. The other side of switch 18 feeds a relay coil 26 via a lead 28 and also feeds an indicator lamp 30 at location 16. Coil 26 and lamp 30 are each returned to round and are therefore energized in response to switch 18 being actuated closed.

Coil 26 is associated with a normally open contact 32 interposed between battery terminal 20 and a line 34. It should be appreciated that since switch 18 controls the energization of relay 26, which in turn controls contact 32, line 34 is electrically energized when switch 18 is actuated. Line 34 is connected to one side of switch 36 which is ganged with switches 38. The other side of switch 36 is coupled to battery terminal 20 via a lead 40. Thus switch 36 when closed will, in effect, override the operation of switch 18 by causing line 34 to be energized. These switches 36 and 38 are preferably located in a separate panel not within easy reach of the driver to require that the driver make a conscious effort to utilize these switches.

Switch 38 is interposed between line 40 and the coil of a relay 42 which is returned to ground. A normally open contact 44 controlled by coil 42 is interposed between battery terminal 20 and a terminal 47 of a quite loud audible alarm 49 such as a horn, which may e heard throughout vehicle 10 for warning crew members that the interlock system has been overridden. The horn 48 is returned to ground and is energized in response to the closure of switches 36 and 38 which energizes coil 42 to close contact 44.

Line 34 is also connected to one side of an indicator lamp 46 which is returned to ground. Lamp 46 is energized in response to actuation of either switches 18 or 36 to indicate that line 34 is energized to enable starting of the vehicle engine. Line 34 is also connected to the wiper 48 of a single pole double throw ignition switch 50 having alternative contacts 52 and 54 associated with wiper 48.

Contact 52, which corresponds to an ON position, is connected to one side of a momentary contact, preferably push button, switch 56 to control energization of an electrical starter motor 58. The other side of switch 56 is connected to the usual starter solenoid coil 60 which is returned to ground and controls the normally open associated contact 62 interposed between battery terminal 20 and the grounded starter 58.

It should be apparent that vehicle 10 may be started with switch 48 in the aforementioned ON position by depressing switch 56 to energize solenoid coil 60 and close contact 62 providing the wiper 48 of switch 50 is electrically energized either by the actuation of switch 18 or of the override switch 36.

To insure that switches 36 or 18 are not inadvertently left actuated after the engine is shut off by moving wiper 48 to engage contact 54, another audible alarm such as a buzzer 64 is provided connected to contact 54. Buzzer 64 need not be nearly as loud as horn 48. Since line 34 remains energized under the aforementioned inadvertent conditions, the buzzer 64, which is returned to ground, is energized when switch 50 is thrown to an OFF position.

While the preferred embodiment of the present invention has been described in specific detail, it should be understood that numerous modifications, additions and omissions in the details thereof are possible within the intended spirit and scope of the invention claimed herein.

What is claimed is:

1. An interlock system for an emergency vehicle for preventing the vehicle engine from being started unless a crew member is manning a post at a predetermined location remote from the driver of the vehicle, said system comprising: an electrical starter for said engine; a first switch means at said post for actuation by said crew member; a first indicator lamp at said post for view by said crew member; a second indicator lamp positioned for being viewed by said driver; a second switch means for actuation by said driver for controlling electrical energization of said starter; and means responsive to actuation of said first switch means for electrically energizing said second switch means for enabling said second switch means to control energization of said starter and for electrically energizing said first and second indicator lamps.

2. The system of claim 1 wherein said second switch means comprises a third switch having a wiper and a pair of associated alternative contacts, said energizing means being coupled to said wiper for energizing said wiper in response to actuation of said first switch means; one of said contacts being coupled to a first audible alarm and the other of said contacts feeding a fourth switch coupled to said starter.

3. The system of claim 2 further comprising a fifth switch means positioned for actuation by said driver, said fifth switch means being coupled between said second switch means and a source of voltage included in said energizing means for said second switch means to be electrically energized in response to actuation of said fifth switch means.

4. The system of claim 3 further comprising a second audible alarm coupled to said fifth switch means for energization in response to actuation of said fifth switch means.

* * * * *